United States Patent [19]
Jeffreys et al.

[11] 4,129,500
[45] Dec. 12, 1978

[54] TREATMENT OF DROPLET DISPERSIONS

[75] Inventors: Godfrey V. Jeffreys; Clive J. Mumford, both of Sutton Coldfield; Frank E. G. Ravault; Colin Washbourne, both of Birmingham, all of England

[73] Assignee: Foseco International Limited, Birmingham, England

[21] Appl. No.: 518,963

[22] Filed: Oct. 29, 1974

[30] Foreign Application Priority Data

Nov. 5, 1973 [GB] United Kingdom ............... 51333/73

[51] Int. Cl.$^2$ .............................................. B01D 13/00
[52] U.S. Cl. .......................... 210/23 R; 210/DIG. 5; 427/244; 427/245
[58] Field of Search ........................ 210/23, 500, 509; 427/244–246; 260/2.5 AY

[56] References Cited
U.S. PATENT DOCUMENTS 3,016,345  1/1962  Price ..................................... 208/187
3,158,532  11/1964  Pall et al. ........................... 210/509 X
3,410,057  11/1968  Lerner ..................................... 55/97

Primary Examiner—Frank A. Spear, Jr.
Attorney, Agent, or Firm—Cushman, Darby & Cushman

[57] ABSTRACT

This invention relates to the treatment of droplet dispersions employing a novel device which is a coalescer element consisting of a body of porous material having communicating porosity and two opposite faces, the pore size increasing progressively from a region at or adjacent one face of the body to the opposite face. In the treatment according to the invention the dispersion is passed through the coalescer element in a direction of increasing pore size and the disperse phase is coalesced by the element. The progressive increase in porosity of the novel coalescer is advantageous in that it provides a large target area at the inlet and hence a high collection efficiency for droplets of disperse phase below 100μm in diameter, without the disadvantage of the high resistance to liquid flow normally associated with devices having a high target area.

3 Claims, No Drawings

TREATMENT OF DROPLET DISPERSIONS

This invention relates to the treatment of droplet dispersions, and particularly to droplet dispersions in which the diameter of the droplets is less than 100 μm.

A droplet dispersion is a two-phase liquid-liquid or liquid-gas system. Dispersions of droplets of one liquid in a continuous phase of another liquid, the two liquids being partially or totally immiscible, and in which the size of the droplets is relatively large (0.5–1.0 mm or larger) are often deliberately made in industrial processes in order to facilitate transfer of solutes from one liquid phase to the other. Liquid droplets in gas (usually referred to as "mists") arise, for example, in the production of sulphuric acid during the $SO_3$ obsorption stage. Various means have been proposed for producing coalescence of such droplet dispersions into two continuous phases.

Unfortunately the coalescence of two droplets into a larger droplet sometimes results in the formation of one or more very small additional droplets whose diameters are in the order of 2–100 μm. Such very small droplets can also be formed when a system containing two immiscible or partially miscible liquid phases is subjected to shear forces, for example, in a pump, or when a tank which has contained crude petroleum is cleaned by means of a high-pressure water jet. Droplet dispersions whose droplets are of this order of size are often opalescent or milky in appearance, and are commonly known as "secondary hazes". Such secondary hazes are very difficult indeed to coalesce, and when present as droplets of water in aviation fuel, as droplets of oil in aqueous industrial effluents, or as droplets of oil in the discharge to sea of the tank washings of a petroleum tanker vessel, are a serious nuisance.

Various means have been proposed, and are to some degree in commercial use, for coalescing secondary hazes. Packed beds of materials such as sand, glass fibre or organic fibre serve to coalesce the myriad of small drops to produce a primary dispersion, that is, one containing drops larger than 100 μm, which may then be separated by gravity settlement or other known means. One commerical coalescer, for example, consists of a perforated metal tube on which is wound a thick layer of glass fibre. The secondary haze is fed under pressure to the lumen of the tube, and during its passage through the glass fibre winding is coalesced into a primary dispersion. The pressure difference across such a coalescer is usually in the order of 0.8 to 1.0 kg/cm² which in time can lead to a breakdown of the coalescer through which a preferred flowpath is formed along which the secondary haze can proceed to all intents and purposes unaltered.

The predominant mechanism in secondary dispersion coalescers has been found to be impaction in which droplets collide with, and adhere to or are arrested by, solid surfaces within the bed. A droplet retained in this way remains spherical but is subjected to repeated coalescences with other droplets from the secondary haze. The droplet therefore grows in size until the forces exerted on it by the flow of surrounding fluid are sufficient to cause the droplet to become detached from its substrate. The drop so detached travels through the bed until it is again arrested and the growth-detachment cycle repeated. One factor found to affect the adhesion is surface roughness; the greater the roughness the better the adhesion. Moreover the solid within the bed should be arranged to produce a large target area for impaction. However, methods of producing a large target area, e.g., increase in bed thickness, or decrease in porosity, result in an increase in the pressure necessary to transport fluid through the bed.

Given sufficient bed thickness, droplets apparently grow to an equilibrium size. However, it has been found that the size of the emergent droplets is determined by the exit pore size. Experimental verification of this is that larger droplets fed to the bed break down to the same exit drop size.

On the basis of these two phenomena viz (a) discrete drop growth and detachment and (b) limitation of the exit drop diameter by the exit pore dimensions, it has been found that an improvement in coalescer performance can be achieved by construction of a bed in which there is a progressive increase in pore size from the inlet to the outlet.

According to the present invention there is provided a method of coalescing the disperse phase of a droplet dispersion which comprises passing the droplet dispersion through a porous body having communicating porosity and a progressively increasing pore size from a region at or adjacent the face at which the dispersion enters the body to the face from which the coalesced disperse phase leaves the body.

According to a further feature of the present invention there is provided a coalescer element consisting of a body of porous material having communicating porosity and two opposite faces, the pore size increasing progressively from a region at or adjacent one face of the body to the opposite face thereof.

The progressive increase in porosity of the coalescer of the invention has a particular advantage in that it provides a large target area at the inlet and hence a high collection efficiency for droplets of disperse phase below 100 μm in diameter, without the disadvantage of the high resistance to liquid flow which is normally associated with devices having a high target area. Also, its progressive increase in porosity compensates for the increasing proportion of the cross-sectional area of the coalescer which is taken up by the growing droplets of discontinuous phase, which would otherwise result in high local velocities of continuous phase which might subject the droplets to shear forces resulting in the re-establishment of a secondary haze.

Furthermore, the droplets of coalesced disperse phase remain apart from one another after they leave the coalescence zone, and the risk of further coalescence by droplet collision, which may give rise to undesirably small subsidiary droplets, is substantially eliminated.

This invention also provides a process for the production of a porous body as defined above, but it is not intended to restrict the coalescer elements of the invention to this means of production alone.

Various means are available for producing bodies containing progressively-widening exit channels. For example, progressively widening exit channels can be achieved in a ceramic or sintered metal powder body by incorporating a progressively increasing proportion of organic particles or fibres from one face to the other, which organic matter is burnt out during subsequent sintering or firing of the body to leave a pore volume which progressively increases along a section taken through the body. Such organic matter may also be removed by means of an appropriate solvent to produce an identical result. In a further example, progressively widening exit channels can be achieved in a ceramic or sintered powder metal body by using powder of large particle size on one face and of small particle size on the other face, with a progressive change of particle size between the two faces. A similar structure can be obtained in a powder metal body or in a body fabricated from plastic granules without external application of heat by locating the graded powder mix in a mould and supplying sufficient pressure to cause the particles to flow and fuse together at their points of contact. The same result may be achieved by treating a graded assemblage of particles as described above with a suitable adhesive or binding agent. It is well-known that in some instances when a powder is compressed in a mould, depending on the dimensions of the mould and the characteristics of the powder, the porosity of the resulting compact will vary along the direction of applied pressure, being lowest at the ends of the compact and highest in the centre of the compact, due to the fact that a progressively increasing proportion of the applied force is transmitted to the walls of the mould; this principle may also be employed to yield two bodies having progressively-widening exit channels by cutting the compact so formed into two more or less equal parts the plane of cut being at right-angles to the direction of the applied force.

A body containing progressively-widening exit channels may also be made from a body having communicating and substantially uniform porosity and filling the pores with fibrous or particulate matter, the proportion of filling material per unit volume increasing progressively from one face to the other.

There is preferably provided on the more finely pored face of the body a fibrous mat as described in copending U.S. application Ser. No. 517,254, now abandoned.

A preferred method of making a coalescer with progressively-widening exit channels as herein described is by dipping a body of reticular foam-structured ceramic manufactured as described in British Pat. Nos. 1,388,911, 1,388,912 and 1,388,913 in a well-dispersed slurry of short inorganic fibres as described in British Pat. No. 1,414,566 in such a manner that the slurry is admitted only to one face of the body, then drying, then repeating the processes of dipping and drying until the face of the reticulated ceramic body is totally covered with a layer of fibrous matter, and finally heating to a sufficient temperatuare to remove organic matter. The effect of this is that in the first dip into the fibrous slurry the slurry penetrates well into the interior of the ceramic reticulum but that in subsequent dips the fibres already deposited exert a filtering effect on the slurry which reduces the degree to which it can penetrate the ceramic reticulum; thus the amount of fibres on and between the strands of the ceramic reticulum decreases progressively from the face of the reticulum dipped into the slurry to its opposite face. Thus there is produced a body having on one face an inorganic fibre mat which acts as a coalescer as described in copending U.S. application Ser. No. 517,254 and progressively widening pore spaces in the interval between that face and the opposite face of the body.

Preferably a piece of reticulated ceramic of suitable thickness, usually not less than 10 mm, is sealed on its edges by any appropriate means in order to prevent lateral ingress of slurry, and lowered into a fibrous slurry capable of penetrating the reticulum as defined in British Pat. No. 1,414,566 until the upper face of the reticulated ceramic body is level with the surface of the slurry. It is then withdrawn and dried, and dipped again into the slurry, withdrawn and dried. For a reticular ceramic having 4–10 pores per linear cm it is usually necessary to repeat this dipping process about 5 times in order to occlude one face with a fibrous mat. The resulting body is then dried and heated to 400°–500° C. to remove organic matter.

The coalescer of the invention may take a variety of forms. It may be, for example, a simple circular disc or plate as described above, or an open-ended hollow cylinder (a cylindrical cartridge) in which the droplet dispersion is fed to the body via a central bore.

The following example will serve to illustrate the invention:

EXAMPLE

A piece of 4 pores per linear cm reticular polyester polyurethane foam was cut measuring 15 cm diameter by 2 cm thick.

A slurry was prepared by mixing the following composition by means of a high-speed stirrer:

70 parts by weight of petalite having a particle size less than 125 $\mu$m.

30 parts by weight of china clay.

20 parts by weight of dextrin.

100 parts by weight of water.

½ part by weight of silicone antifoam emulsion.

½ part by weight of a mixture of $C_{18}$-$C_{22}$ alcohols.

To each liter of the slurry so prepared were added 50 ml of monoethanolamine.

The piece of reticular foam was treated with a 0.01% solution in 50% methanol/50% distilled water of an anionic polyacrylamide with an average molecular weight in the range of $3.10^6$ to $1.10^7$ and dried in a current of warm air. It was then dipped into the above slurry. It was then removed, surplus slurry drained off, and then centrifuged off, and the whole was then dried in a current of hot air. The resulting body was again treated with the above polyacrylamide solution, dried in a hot air current, dipped into the slurry, dried and centrifuged.

The coated reticular foam was then heated in an electric muffle furnace to 300° C. at 150° C./hr, held for 2 hours at 300° C., heated to 1250° C. at 100° C./hr, held for 16 hours at 1250° C., then cooled to room temperature at a rate not exceeding 100° C./hr.

The resulting lithia-alumina-silica reticular ceramic disc which measured 12 cm diameter by 1.5 cm thick was then sealed around its edges by means of a heat-curing plastics paste.

A second slurry was prepared in the following manner:

7 grams of aluminosilicate fibre of average length 1 mm were dispersed in 87.5 grams of a 0.25% w/w sol. in water of modified carboxy-vinyl polymer whose solutions have the property of undergoing a large increase in viscosity when neutralised by means of a high-speed shearing mixer. When all the fibres were well-dispersed and separated from one another, ammonia soln. (s.g. 0.880) was added dropwise until a marked increase in viscosity occurred, at which point the pH of the slurry was in the region of 10. To this dispersion was added 5.5 grams of a colloidal silica hydrosol containing 30% w/w colloidal silica solids in water, and the whole was again thoroughly mixed.

The ceramic disc was held in the horizontal plane and partially immersed in the fibre slurry. The disc was then withdrawn and dried at 110° C. This process was repeated 5 times, after which the pores of the lower face of the ceramic disc were observed to be occluded by fibrous matter. The fibre impreganted disc was then heated to 500° C. for 1 hour to remove organic matter, and cooled, The disc was then mounted in a ring of acrylic plastics and the edges of the disc secured and sealed to the ring by means of a heat-cured resin. The disc was installed in an apparatus in which it was first primed by treating it with kerosene, after which a secondary haze of kerosene droplets from 5 to 25 μm, in diameter at a concentration of 3.5% v/v kerosene in water was fed to the fibre occluded face. This secondary haze was produced by means of variable speed pumps and throttle valves. At a pressure difference of 1.7 p.s.i. (11.7 KPa) across the coalescer, a flowrate of 0.9 cm.s$^{-1}$ of dispersed phase was achieved, the emergent droplets having diameters in the range 0.1–1.5 mm, principally between 0.15 and 0.5 mm. These droplets had satisfactory settling rates under gravity.

We claim as our invention:

1. A method of coalescing the disperse phase of a droplet dispersion which comprises passing the droplet dispersion through a porous body of reticular foam-structured ceramic material of progressively increasing pore size from a region at or adjacent the face at which the dispersion enters the body to the face from which the coalesced disperse phase leaves the body.

2. A method according to claim 1 wherein the droplet dispersion is a liquid-in-liquid dispersion and the disperse phase is a hydrocarbon liquid.

3. The method of claim 1 wherein the porous foam-structured ceramic material is made by dipping a body of reticular foam-structured ceramic in a slurry of short inorganic fibers in such a manner that the slurry is admitted only to one face of the body, then drying, then repeating the processes of dipping and drying until the face of the reticulated ceramic body is totally covered with a layer of fibrous matter, and finally heating to a sufficient temperature to remove organic matter.

* * * * *